United States Patent
MacPherson

(10) Patent No.: US 7,410,104 B2
(45) Date of Patent: Aug. 12, 2008

(54) HEAT SOURCE FOR RADIANT HEATING SYSTEM

(75) Inventor: Murdoch MacPherson, Regina (CA)

(73) Assignee: MacPherson Engineering Inc., Saskatchewan (CA)

( * ) Notice: Subject to any disclaimer, the term of this patent is extended or adjusted under 35 U.S.C. 154(b) by 204 days.

(21) Appl. No.: 11/141,750

(22) Filed: Jun. 1, 2005

(65) Prior Publication Data

US 2005/0279343 A1    Dec. 22, 2005

(30) Foreign Application Priority Data

Jun. 1, 2004 (CA) .................. 2473359
Nov. 29, 2004 (CA) .................. 2488898

(51) Int. Cl.
*F24D 5/10* (2006.01)
(52) U.S. Cl. .............. 237/69; 165/49; 165/56
(58) Field of Classification Search .......... 237/69, 237/43; 454/185; 165/56, 49, 171
See application file for complete search history.

(56) References Cited

U.S. PATENT DOCUMENTS

| | | | | |
|---|---|---|---|---|
| 2,442,201 A * | 5/1948 | Elberty, Jr. ................ 165/259 |
| 3,157,358 A * | 11/1964 | Birkemeier ................ 237/1 R |
| 3,929,186 A * | 12/1975 | Becker ...................... 165/49 |
| 3,999,710 A * | 12/1976 | Kemmerer ................ 237/53 |
| 4,011,989 A * | 3/1977 | Diggs ......................... 237/59 |
| 4,205,719 A * | 6/1980 | Norell et al. ................ 165/76 |
| 4,285,332 A * | 8/1981 | McHugh ..................... 126/632 |
| 4,369,836 A * | 1/1983 | Bleckmann ................ 165/171 |
| 4,379,447 A * | 4/1983 | Schott et al. ................ 126/117 |
| 4,440,343 A * | 4/1984 | Bergeron, Jr. .............. 237/69 |
| 4,501,128 A * | 2/1985 | Gallagher ................... 62/238.6 |
| 4,779,673 A * | 10/1988 | Chiles et al. ................ 165/45 |
| 4,865,120 A * | 9/1989 | Shiroki ....................... 165/56 |
| 4,880,051 A * | 11/1989 | Ohashi ....................... 165/45 |
| 5,022,459 A * | 6/1991 | Chiles et al. ................ 165/11.1 |
| 5,046,481 A * | 9/1991 | Warwick ..................... 126/522 |
| 5,263,538 A * | 11/1993 | Amidieu et al. ............. 165/168 |
| 5,327,737 A * | 7/1994 | Eggemar ..................... 62/66 |
| 5,433,087 A * | 7/1995 | Locatelli .................... 62/520 |
| 5,454,428 A * | 10/1995 | Pickard et al. .............. 165/49 |
| 5,542,603 A * | 8/1996 | Macduff ..................... 237/69 |
| 5,577,554 A * | 11/1996 | Umina ....................... 165/53 |
| 5,579,996 A * | 12/1996 | Fiedrich ..................... 237/69 |
| 5,788,152 A * | 8/1998 | Alsberg ...................... 237/69 |
| 5,964,402 A * | 10/1999 | Jakobson .................... 237/69 |
| 6,047,695 A * | 4/2000 | Eberhardt ................... 126/515 |
| 6,126,081 A * | 10/2000 | Calvin et al. ............... 237/12.3 B |

(Continued)

*Primary Examiner*—Derek S. Boles
(74) *Attorney, Agent, or Firm*—Standley Law Group LLP

(57) ABSTRACT

A radiant heating system includes an air-to-fluid heat exchanger, a radiant heating loop and a pump and conduits to circulate heating fluid between the air-to-fluid heat exchanger and the radiant fluid loop. The air-to-fluid heat exchanger is installed within a hot air duct connected to a conventional forced air furnace; preferably in a section of the hot air duct located near the forced air furnace with an expanded cross-section. In operation, the apparatus uses heated air supplied by the forced air furnace to heat the heating fluid circulating through the apparatus. Some of the heat from an air flow supplied by the forced air furnace passing through the hot air duct is transferred to heating fluid in the air-to-fluid heat exchanger, installed within the hot air duct. This heating fluid is then circulated through a radiant heating loop to heat a desired area.

16 Claims, 2 Drawing Sheets

U.S. PATENT DOCUMENTS 6,220,523 B1 * 4/2001 Fiedrich .................... 237/69
6,283,382 B1 * 9/2001 Fitzemeyer ................ 237/69
6,345,770 B1 * 2/2002 Simensen .................. 237/69
6,427,923 B1 * 8/2002 Neve et al. ................ 237/2 A
6,467,174 B1 * 10/2002 Kotori ...................... 30/293
6,550,687 B2 * 4/2003 Lyons et al. ............... 237/55
6,908,039 B2 * 6/2005 Lyons et al. ............... 237/55

* cited by examiner

HEAT SOURCE FOR RADIANT HEATING SYSTEM

This invention is in the field of heating systems and more particularly relates to a radiant heating system using heating fluid.

BACKGROUND

Many buildings heating systems, especially residential buildings heating systems, use a primary heating system which comprises a forced air furnace for heating and cooling. Air is heated by the forced air furnace and dispersed throughout the building through ducting. While there are many advantages and reasons for using a forced air furnace as the primary heating system in a building, there are some applications where it is desirable to have in addition to the forced air heating, a radiant heating system using circulating heating fluid for specialized heating, that cannot be achieved with a forced air furnace alone.

Additionally, using forced air heating alone often involves some disadvantages. A common disadvantage of using a forced air furnace alone is that the heated air in a room, because it has a tendency to rise, can often leave the floor of the room cooler than the surrounding air. This problem is further exaggerated when the building comprises multiple floors, such as a main floor and a basement. The thermostat for the forced air furnace is typically on a main level with the result that the main level is often comfortable, but the lower levels, such as the basement are somewhat cooler than the main level. Basements also typically have ceiling diffusers that are used to supply the heated air to spaces, which further exaggerates the problems with the heated air in a room tending to rise because the ceiling diffusers introduce the heated air into the basement space at ceiling level.

Often these disadvantages and/or problems can be addressed with the use of a secondary radiant heating system that uses circulated heating fluid. These radiant heating systems provide heat by having heated fluid circulated through them in a series of conduits or a heating loop. Heat from the heating fluid circulating through the radiant heating loop is radiated to the surrounding area and heats the surrounding area. For example, if a radiant heating system in the form of an in-floor heating system is used in the basement, the floor in the basement is warmed by the radiant heating system and can maintain the basement space at a much more comfortable temperature than just using the forced air system alone.

The disadvantage of using a secondary radiant heating system that operates using circulating heating fluid is that there must be a heat source for heating the heating fluid to be circulated through the radiant heating system. Typically, in the prior art systems a boiler system is installed, which is completely separate and is additional to the forced air furnace, which is used as the primary heating system for the building. This boiler is then used to heat the heating fluid to be circulated through the radiant heating system. The disadvantage of using a boiler is that boilers are more complex to design, operate and maintain than forced air furnaces. Additionally, there is the added expense of the boiler which is purchased in addition to the forced air furnace that will be used as the primary source of heating, cooling and ventilation that may be already in place.

SUMMARY OF THE INVENTION

It is an object of the present invention to provide a secondary heating system for use in a building with a primary heating system comprising a forced air furnace that overcomes problems and disadvantages of the prior art.

The present invention provides, in a first embodiment, a radiant heating system comprising: an air-to-fluid heat exchanger adapted for installation in a hot air duct connected to a forced air furnace; a radiant heating loop adapted to be arranged to heat a desired area; and a pump and conduits connected to the air-to-fluid heat exchanger and to the radiant heating loop and operative to circulate heating fluid through the air-to-fluid heat exchanger and the radiant heating loop. The heating fluid circulating through the air-to-fluid heat exchanger is heated by hot air flowing through the hot air duct, and thereby heats the radiant heating loop and the desired area.

The present invention provides, in a second embodiment, a method of heating a desired area, the method comprising: providing a air-to-fluid heat exchanger installed within a hot air duct connected to a forced air furnace; arranging a radiant heating loop to heat the desired area and operatively connecting the radiant heating loop to the air-to-fluid heat exchanger such that heating fluid can be circulated through the air-to-fluid heat exchanger, through the radiant heating loop, and back through the air-to-fluid heat exchanger; operating the forced air furnace to blow hot air through the hot air duct; and circulating heating fluid through the air-to-fluid heat exchanger and the radiant heating loop.

In one embodiment of the present invention, an apparatus is provided that comprises: an air-to-fluid heat exchanger; a radiant heating loop; and a pump and conduits to circulate heating fluid between the air-to-fluid heat exchanger and the radiant fluid loop. The air-to-fluid heat exchanger is installed within a hot air duct connected to a conventional forced air furnace. Typically, a supply fluid conduit is connected on one end to an output on the air-to-fluid air exchanger and on the other end to a radiant heating loop and a return fluid conduit is connected on one end to an input on the air-to-fluid air exchanger and on the other end to a radiant heating loop.

In operation, the forced air furnace heats air and supplies the heated air to a hot air duct. The hot air duct then directs this heated air flow to different spaces in the building to be heated. The air-to-fluid heat exchanger is located in this air flow in the hot air duct and as the heated air flow passes across the air-to-fluid heat exchanger some of the heat of the heated air will be drawn by the air-to-fluid heat exchanger and will heat the heating fluid circulated through the apparatus. This heating fluid will then be circulated by a pump out of the air-to-fluid heat exchanger, through the fluid supply conduit and into the radiant heating loop. The heating fluid will then circulate through the radiant heating loop where some of the heat in the heating fluid will be drawn out by the radiant heating loop and heat the area surrounding the radiant heating loop. After the heating fluid has circulated through the radiant heating loop, it will be circulated through the return fluid conduit and back into the air-to-fluid heat exchanger, where this heating fluid will once again be warmed by the heated air flow in contact with the air-to-fluid heat exchanger.

The present invention can also be used to cool ambient air passing through the hot air duct if the area surrounding the radiant heating loop is cooler than the air passing through the hot air duct. The heating function of the forced air furnace can be shut off and the forced air furnace will then blow unheated air through the hot air duct. By circulating the heating fluid through the radiant heating loop, heat in the heating fluid can be dissipated to the cooler area surrounding the radiant heating loop. This cooled heating fluid can then be circulated through the air-to-fluid heat exchanger and can lower the temperature of air passing through the hot air duct and coming into contact with the air-to-fluid heat exchanger.

The disclosed invention is particularly applicable to an in-floor system, especially where the in-floor heating loop is embedded in the concrete slab of a basement floor. The present invention, when the radiant heating loop is embedded in the slab of a basement floor or cast into a concrete slurry poured on top of an existing basement slab, can keep the basement at a comfortable temperature while a forced air furnace is operating to heat the building in general.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
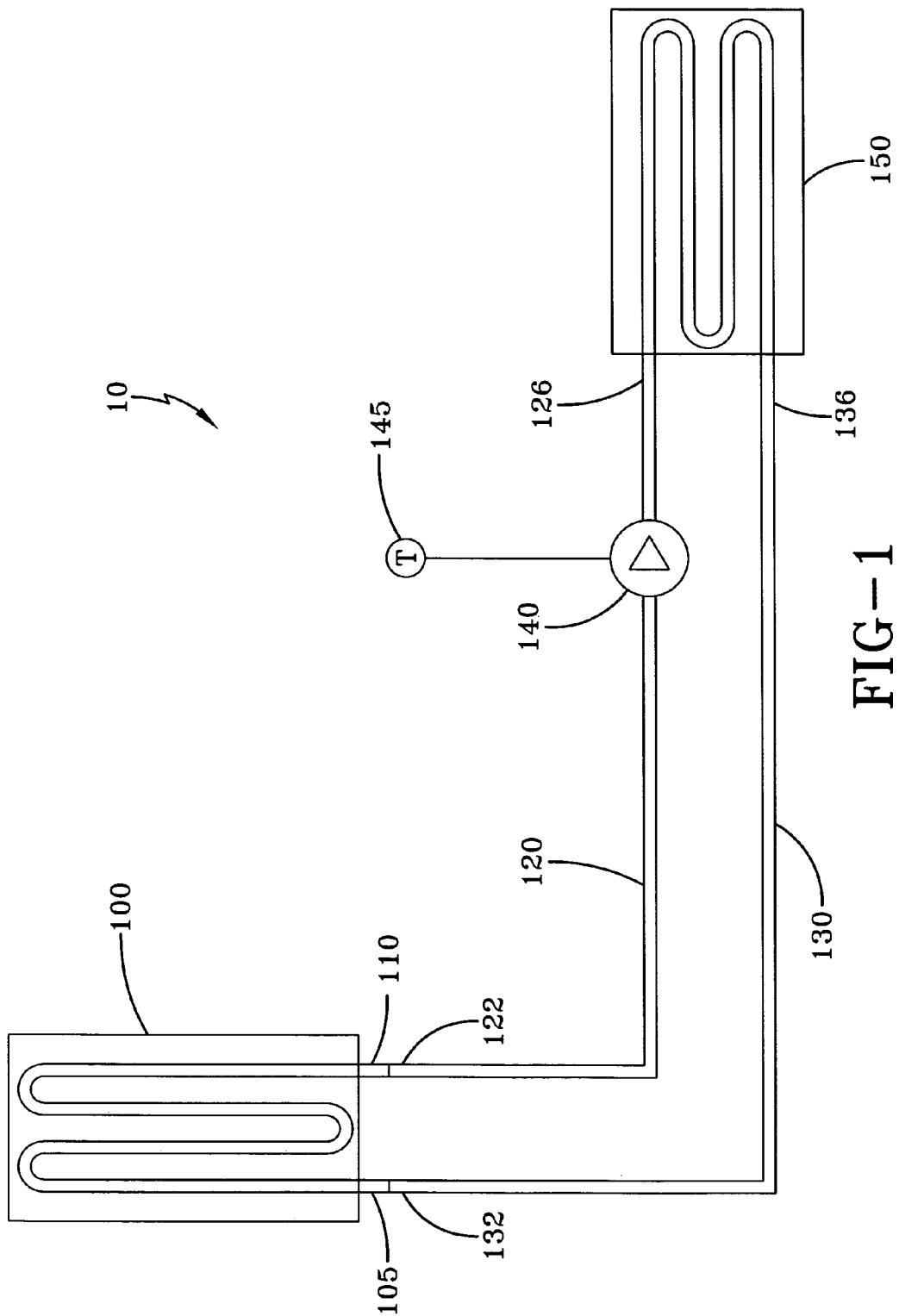
FIG. 1 is a schematic of an apparatus in accordance with the present invention.
Figure 2:
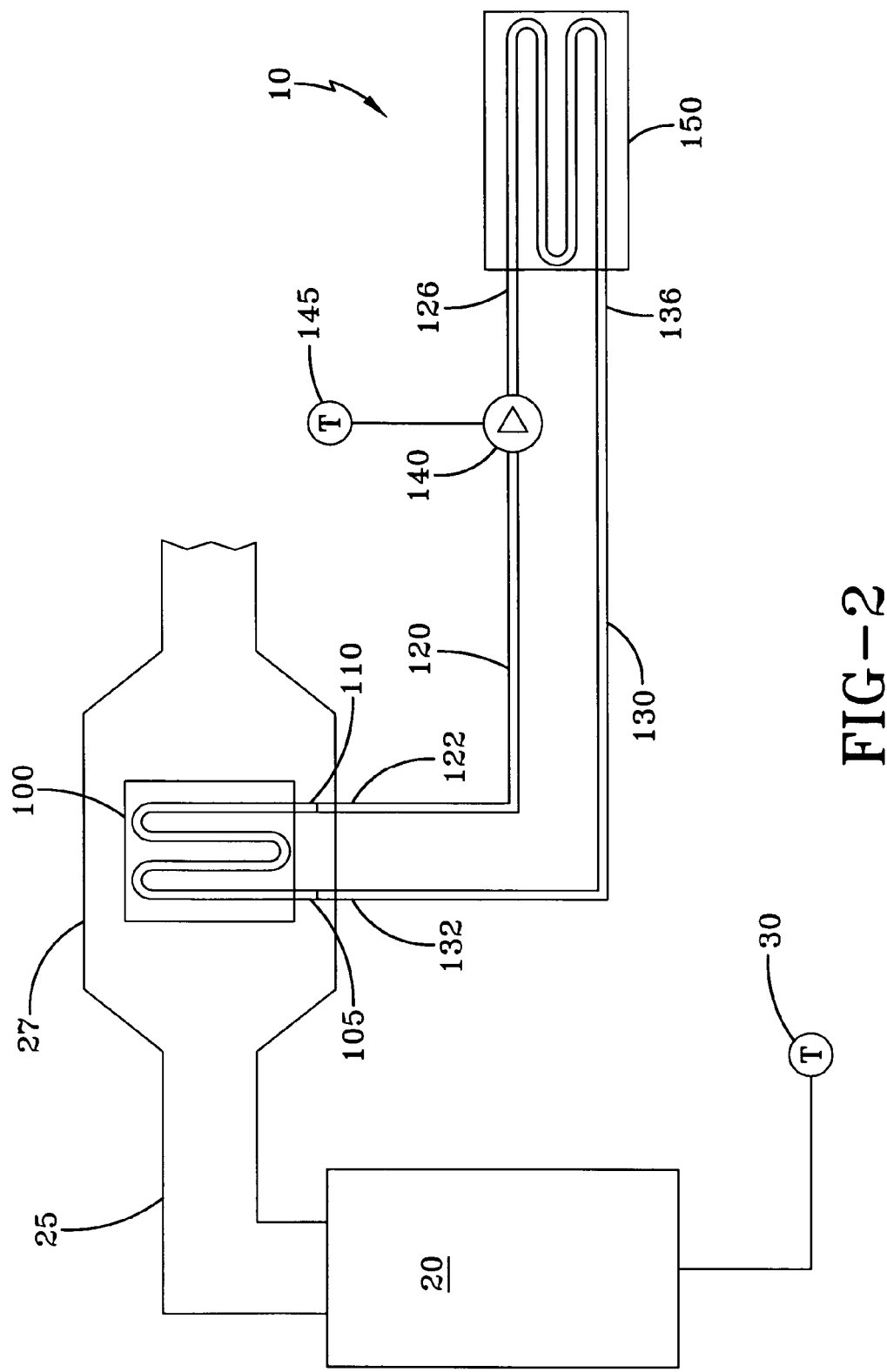
FIG. 2 is a schematic of the apparatus of FIG. 1 installed in conjunction with a forced air furnace in accordance with the present invention.

FIG. 1 is a schematic illustration of an apparatus 10 that is an embodiment of the present invention. The apparatus 10 comprises: an air-to-fluid heat exchanger 100; a fluid supply conduit 120; a fluid return conduit 130; a pump 140; a secondary thermostat 145; and a radiant heating loop 150. FIG. 2 illustrates the apparatus 10 installed in conjunction with a forced air furnace 20 connected to a hot air duct 25.

Referring to FIG. 2, the forced air furnace 20 can be any forced air furnace as commonly known by those skilled in the art, such as for example a gas furnace, oil furnace or heat pump. The forced air furnace 20 will typically be the primary source of heating for the building and will be connected to the hot air duct 25. The hot air duct 25 is operative to distribute an air flow that is heated by the forced air furnace 20 throughout the building. The forced air furnace 20 will typically be controlled with a furnace thermostat 30 that is located in the main occupied heated area the furnace thermostat 30 will be in electrical communication with the forced air furnace 20.

The hot air duct 25 would preferably comprise an expanded duct section 27. The expanded duct section 27 is preferably located in relatively close proximity to the forced air furnace 20. The expanded duct section 27 will be a section of the hot air duct 25 with a greater cross-section than the cross-section of the hot air duct 25 immediately preceding and following the expanded duct section 27.

The air-to-fluid heat exchanger 100 can be any air-to-fluid heat exchanger that is operative to transfer heat from air flow in the hot air duct 25 to heating fluid circulating through the air-to-fluid heat exchanger 100. The air-to-fluid heat exchanger 100 will typically have an input connection 105 for heating fluid to be circulated into the air-to-fluid heat exchanger 100 and an output connection 110 for heating fluid to be circulated out of the air-to-fluid heat exchanger 100 after the heating fluid has completely circulated through the air-to-fluid heat exchanger 100.

The fluid that is circulated through the apparatus 10 can be any heating fluid that is operative to store and transfer heat through the apparatus 10, but would typically be water, treated water, or glycol.

The fluid supply conduit 120 has a first end 122 and a second end 126. The first end 122 of the fluid supply conduit 120 is connectable to the output connection 105 of the air-to-fluid heat exchanger 100 and the second end 126 of the fluid supply conduit 120 is connectable to the radiant heating loop 150.

The fluid return conduit 130 has a first end 132 and a second end 136. The first end 122 of the fluid return conduit 130 is connectable to the input connection 110 of the air-to-fluid heat exchanger 100 and the second end 136 of the fluid return conduit 130 is connectable to the radiant heating loop 150.

The pump 140 is any pump that is operative to circulate the fluid through the apparatus 10. The pump 140 is illustrated in FIGS. 1 and 2 as connected to the fluid supply conduit 120, however, someone skilled in the art will readily appreciate that the pump 140 could be incorporated into the apparatus 10 in many locations including in the return supply conduit 130.

Typically, the pump 140 will be controlled by a secondary thermostat 145. The secondary thermostat 145 will be located in the building in suitable proximity to the radiant heating loop 150 and the secondary thermostat 145 is operative to start or stop the pump 140 based on predetermined temperature thresholds, which in turn will cause the fluid in the apparatus 10 to be circulated or stopped, respectively.

The radiant heating loop 150 is a series of tubing or other conduits through which the heating fluid will circulate and heat the area in proximity to the radiant heating loop 150. Typically, the radiant heating loop 150 will be in-floor or in-slab heating system. These in-floor or in-slab heating systems typically comprise a plurality of plastic tubing that is either cast into a cement floor of new construction or cast into a concrete slurry that is topped over an existing slab. Alternatively, the radiant heating loop 150 could be a specialized heating loop such as a radiator style heater, in-wall heating, towel warmer, radiant wall panel, etc.

In operation, the air-to-fluid heat exchanger 100 is located within the hot air duct 25. When air heated by the furnace flows through the hot air duct 25 and around the air-to-fluid heat exchanger 100, some of heat of the heated air will be transferred to the heating fluid in the air-to-fluid heat exchanger 100. This heating fluid will then pass out of the 5 output connection 110 through the first end 122 of the fluid supply conduit 120, into the fluid supply conduit 120, through the fluid supply conduit 120 and into the radiant heating loop 150. The heating fluid will then circulate through the radiant heating loop 150. The radiant heating loop 150 will draw out some of the heat from the heating fluid as the heating fluid circulates through the radiant heating loop 150. If the radiant heating loop 150 is in-floor heating, for example, heat from the heating fluid will be transferred to the floor, warming the floor the radiant heating loop 150 is installed in. Once the heating fluid has circulated through the radiant heating loop 150, the heating fluid will then pass into the fluid return conduit 130 and back into the air-to-fluid heat exchanger 100, where the heating fluid will again be warmed by the heated air flowing through the hot air duct 25.

Preferably, the hot air duct 25 will also comprise an expanded duct section 30 and the air-to-fluid heat exchanger 100 will be located within the expanded duct section 30. The expanded duct section 30 will have a greater cross-sectional area then the rest of the hot air duct 25 and, as a result, the flow of heated air from the forced air furnace 20, that is passing through the hot air duct 25, will slow down through the expanded duct section 30 and minimize the pressure drop through the air-to-fluid heat exchanger 100.

The furnace thermostat 30 that is in electrical connection with the forced air furnace 20 will control the forced air furnace 20. When the forced air furnace 20 is in operation, heating air and supplying this heated air into the hot air duct 25, and the apparatus 10 is circulating fluid through the air-to-fluid heat exchanger 100 and throughout the rest of the apparatus 10, some of the heat from the heated air will be drawn out of the air to the heating fluid in the air-to-fluid heat exchanger 100. This will tend to cause a reduction in the temperature of the heated air flow in the hot air duct 25 downstream from the air-to-fluid heat exchanger 100. As a result, the furnace thermostat 30 will have the forced air furnace 20 run longer to satisfy the space heating requirements for the space the furnace thermostat 30 is monitoring. This in turn will cause heated air to flow past the air-to-fluid heat exchanger 100 for a longer period of time, helping to further warm the area around the radiant heating loop 150.

Preferably, the apparatus 10 will also comprise a secondary thermostat 145. The secondary thermostat 145 will monitor the temperature of the space in proximity to the radiant heating loop 150. Alternatively, the secondary thermostat 145 could monitor the temperature of the heating fluid in any part of the apparatus 10 (for example, it might be desirable to monitor the heating fluid temperature in the radiant heating loop 150, itself). The secondary thermostat 145 is in electrical communication with the pump 140 and is operative to start or stop the pump 140. While the secondary thermostat 145 measures a temperature below a predetermined level, the secondary thermostat 145 will operate the pump 140 causing the heating fluid in the apparatus 10 to circulate through the air-to-fluid heat exchanger 100 and provide heated heating fluid to the radiant heating loop 150. When the secondary thermostat 145 measures a temperature at or above the predetermined level, the secondary thermostat 145 will stop the pump 140 and heating fluid heated in the air-to-fluid heat exchanger 100 will stop being circulated through the radiant heating loop 150. The forced air furnace 20 will then operate as a conventional forced air furnace 20. When the secondary thermostat 145 determines that the temperature has once again dropped below a predetermined level, the secondary thermostat 145 can once again start the pump 140, and heating fluid heated by the air-to-fluid heat exchanger 100 can once again be circulated through the radiant heating loop 150.

The present invention can also be operated to cool air flowing through the hot air duct 25 in the summer months or other times when the area surrounding the radiant heating loop 150 is below ambient temperature. Typically, forced air furnaces 20 can blow air through the hot air duct 25 without the forced air furnace 20 being ignited and heating the air. The result is an air flow through the hot air duct 25 that has not been heated by the forced air furnace 20 and is at approximately ambient temperature. The pump 140 can be started and the heating fluid in the apparatus 10 circulated. The surroundings of the radiant heating loop 150 will cool the heating fluid in the radiant heating loop 150. This heating fluid will then be circulated through the air-to-fluid heat exchanger 100. The cooled heating fluid circulating through the air-to-fluid heat exchanger 100 will draw some of the heat from the air flow coming into contact with the air-to-fluid heat exchanger 100, cooling the air flow. This cooled air flow will then be dispersed throughout the building via the ducting connected to the forced air furnace 20.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A method of heating a desired area in a building having at least one room, the method comprising:
   providing an air-to liquid heat exchanger installed within a hot air duct connected to a forced air furnace, the air-to-liquid heat exchanger installed downstream from the forced air furnace;
   arranging a radiant heating loop below a floor surface to heat the desired area and operatively connecting the radiant heating loop to the air-to- liquid heat exchanger such that heating liquid can be circulated through the air-to-liquid heat exchanger, through the radiant heating loop, and back through the air-to-liquid heat exchanger;
   operating the forced air furnace to blow heated air through the hot air duct, past the air-to-liquid heat exchanger, and disperse the heated air into the at least one room of the building; and
   circulating heating through the air-to-liquid heat exchanger and the radiant heating loop.

2. The method of claim 1 wherein the radiant heating loop is embedded in a concrete basement floor, and further comprising a method of cooling air passing through the hot air duct, the method comprising deactivating the heating function of the forced air furnace and operating the forced air furnace such that the forced air furnace blows air at ambient temperature through the hot air duct, whereby the heating liquid circulating through the concrete basement floor is cooled and thereby cools the air blown by the forced air furnace.

3. The method of claim 2 further comprising:
   connecting a thermostat such that when the thermostat measures a temperature above a predetermined level, the heating liquid stops circulating through the radiant heating loop; and
   when the thermostat measures a temperature below a predetermined level, the heating liquid circulates through the radiant heating loop.

4. The method of claim 1 wherein the air-to-liquid heat exchanger is installed in an expanded duct section of the air duct and the expanded duct section has a greater cross-sectional area than the cross-sectional area of the air duct upstream from the expanded duct section.

5. The method of claim 3 wherein the heating liquid comprises at least one of water, treated water, and glycol.

6. The method of claim 1 further comprising:
   connecting a thermostat such that when the thermostat measures a temperature above a predetermined level, the heating liquid stops circulating through the radiant heating loop; and
   when the thermostat measures a temperature below a predetermined level, the heating liquid circulates through the radiant heating loop.

7. The method of claim 2 wherein the air-to liquid heat exchanger is installed in an expanded duct section of the air duct and the expanded duct section has a greater cross-sectional area than the cross-sectional area of the air duct upstream from the expanded duct section.

8. The method of claim 3 wherein the air-to-liquid heat exchanger is installed in an expanded duct section of the air duct and the expanded duct section has a greater cross-sectional area than the cross-sectional area of the air duct upstream from the expanded duct section.

9. The method of claim 6 wherein the air-to-liquid heat exchanger is installed in an expanded duct section of the air duct and the expanded duct section has a greater cross-sectional area than the cross-sectional area of the air duct upstream from the expanded duct section.

10. The method of claim 6 wherein the heating liquid comprises at least one of water, treated water, and glycol.

11. A heating system for heating a building comprising at least one room, the heating system comprising:
- a forced air furnace operative to heat air in an air flow;
- a hot air duct connected to the forced air furnace and operative to deliver the heated air in the air flow to be dispersed in the at least one room in the building;
- an air-to-liquid heat exchanger installed in the hot air duct downstream from the forced air furnace;
- a radiant heating loop arranged below a floor surface to heat a desired area; and
- a pump and conduits connected to the air-to-liquid heat exchanger and to the radiant heating loop and operative to circulate heating liquid through the air-to-liquid heat exchanger and the radiant heating loop,
- whereby the heating liquid circulating through the air-to-liquid heat exchanger is heated by heated air in the air stream flowing through the hot air duct, and thereby heats the radiant heating loop and the desired area.

12. The system of claim 11 comprising a thermostat in electrical communication with the pump and operative to stop the pump when the temperature measured by the thermostat exceeds a predetermined temperature and to start the pump when the temperature measured by the thermostat drops below a predetermined temperature.

13. The system of claim 11 wherein the radiant heating loop is installed in a concrete floor slab.

14. The system of claim 11 wherein the air-to-liquid heat exchanger comprises a coil.

15. The system of claim 11 wherein the air duct comprises an expanded duct section and the air-to-liquid heat exchanger is adapted to be installed into the expanded duct section and wherein the expanded duct section has a cross-sectional area greater then the cross-sectional area of the air duct upstream from the expanded duct section.

16. The system of claim 11 wherein the heating liquid comprises at least one of water, treated water, and glycol.

* * * * *

UNITED STATES PATENT AND TRADEMARK OFFICE
CERTIFICATE OF CORRECTION

| | | |
|---|---|---|
| PATENT NO. | : 7,410,104 B2 | Page 1 of 1 |
| APPLICATION NO. | : 11/141750 | |
| DATED | : August 12, 2008 | |
| INVENTOR(S) | : MacPherson | |

It is certified that error appears in the above-identified patent and that said Letters Patent is hereby corrected as shown below:

In column 4, line 42, please delete "5".

In column 6, line 21, please delete "heating through" and insert -- heating liquid through --.

In column 6, line 56, please delete "air-to liquid" and insert -- air-to-liquid --.

Signed and Sealed this

Thirtieth Day of September, 2008

JON W. DUDAS
*Director of the United States Patent and Trademark Office*